United States Patent
Wilson, Sr.

(10) Patent No.: US 11,381,064 B2
(45) Date of Patent: Jul. 5, 2022

(54) CONDUIT PULL BODY AND METHODS OF ON-THE-JOB-SITE CONSTRUCTION AND INSTALLATION

(71) Applicant: Laurin Thomas Wilson, Sr., Georgetown, SC (US)

(72) Inventor: Laurin Thomas Wilson, Sr., Georgetown, SC (US)

( * ) Notice: Subject to any disclaimer, the term of this patent is extended or adjusted under 35 U.S.C. 154(b) by 304 days.

(21) Appl. No.: 16/848,785

(22) Filed: Apr. 14, 2020

(65) Prior Publication Data
US 2021/0320482 A1 Oct. 14, 2021

(51) Int. Cl.
*H02G 3/06* (2006.01)
*H02G 1/08* (2006.01)
*H02G 3/04* (2006.01)

(52) U.S. Cl.
CPC ............... *H02G 3/06* (2013.01); *H02G 1/08* (2013.01); *H02G 3/0418* (2013.01)

(58) Field of Classification Search
CPC ........... H02G 3/06; H02G 1/08; H02G 3/0418
USPC .......................................................... 285/18
See application file for complete search history.

(56) References Cited

U.S. PATENT DOCUMENTS

| | | | | |
|---|---|---|---|---|
| 2,861,705 A * | 11/1958 | Scott | ............. | H02G 3/081 220/3.9 |
| 3,168,613 A * | 2/1965 | Palmer | ............. | H02G 3/086 174/650 |
| 4,151,926 A * | 5/1979 | Kinney | ............. | H02G 3/081 220/3.94 |
| 4,818,822 A * | 4/1989 | Yahraus | ............. | H02G 3/083 220/4.24 |
| 4,936,478 A * | 6/1990 | Bozdeck | ............. | H02G 3/081 D13/152 |
| 6,069,317 A * | 5/2000 | Wagganer | ............. | H02G 3/088 174/650 |
| 6,386,891 B1 * | 5/2002 | Howard | ............. | H01R 12/52 439/76.1 |
| 7,259,337 B1 * | 8/2007 | Gretz | ............. | H02G 3/06 220/241 |
| 7,446,266 B1 * | 11/2008 | Gretz | ............. | H02G 3/06 220/241 |
| 8,242,386 B1 * | 8/2012 | Baldwin | ............. | H02G 3/081 174/480 |
| 9,029,715 B1 * | 5/2015 | Baldwin | ............. | H02G 3/081 174/480 |

(Continued)

*Primary Examiner* — Timothy J Thompson
*Assistant Examiner* — Michael F Mcallister

(57) ABSTRACT

A conduit pull body with an elongated generally square cross-section cavity defined by two generally square ends and four generally rectangular lateral panels (front, back and two sides) in which the back and at least one of the front and two side panels are selectively removable to increase access to the cavity for pulling cabling therethrough.
Where at least two of the removeable panels are adjacent, lateral access to the cavity (as represented by the longitudinal centerline) is not less than about 180 degrees, about 270 degrees where three removeable panels are adjacent.
Where at least one of the front and two sides is apertured and interchangeable with a second one of the front and two sides, the pull body is convertible between Type LB, Type LL and Type LR pull bodies. On-the-job-site construction of different types of pull bodies is possible from a selection of component parts.
Methods of improving cavity access and creating different pull body types are disclosed.

20 Claims, 5 Drawing Sheets

(56) References Cited

U.S. PATENT DOCUMENTS

2008/0236862 A1\* 10/2008 Elder .................... H02G 3/081
 174/87
2011/0120582 A1\* 5/2011 Veillette ................ H02G 3/086
 138/109

\* cited by examiner

CONDUIT PULL BODY AND METHODS OF ON-THE-JOB-SITE CONSTRUCTION AND INSTALLATION

BACKGROUND OF THE INVENTION

The present invention relates to an improved conduit pull body used in pulling cabling through electrical conduit. As used throughout this application, the term "conduit" refers to elongated hollow protective enclosures for electrical, electronic or fiber optic cabling of any size or shape. The conduit may be made of any material appropriate for the environment in which used, and the nature of the cabling protected.

Conduit is generally run with only right angle turns and elbows such as shown in FIG. 1 are common. The angled back plate 10 is removable to provide straight line access both to the "input" conduit 12 and the "output" conduit 14. The free ends of the cabling may be inserted through the open back into both conduits and pushed completely into the body 16 and/or pulled from a remote access point. Alternatively, the cabling may be pulled into the body through one conduit 12 and then pushed (or pulled from a remote access point) into the other conduit 14.

As is readily apparent in FIG. 1, the access of the installer to the conduits 12, 14 is restricted by the size of the plate 10 and the pulling of the cabling can be difficult, particularly where the cabling has a relatively large diameter and/or is stiff and resists sharp bends.

Because of the limited access given the installer, it is far more common to use pull bodies having an elongated body such as shown in FIG. 2. As shown in FIG. 2, the elongation of the "box" 18 facilitates a longer removable back 20 and thus an enlarged opening which provides far greater access to the pull box cavity when pulling cabling into the box 18 through the "input" conduit 22, i.e., the pulling angle is less acute and there is more room for the cabling to bend. Because the back 20 is completely removable, it is possible to use the space outside of the pull body cavity along the axis of the conduit 24 in manipulating the cabling.

Pull bodies come in a variety of configurations to facilitate their use with different numbers of conduits and different desired paths for the cabling therethrough. The pull body of FIG. 2 is known as a Type LB body, i.e., the exit of the conduit from the pull body is through the bottom of the box. However, the exit conduit 24 may be through the left side of the box as shown in FIG. 3 (Type LR), or the right side conduit 24 (Type LL) as shown in FIG. 4.

Where there are two exit conduits (or two input conduits) as shown in FIG. 5, the pull body is known as a Type T. Type T pull boxes are not generally used to splice cabling, but are used where two entirely different cables enter the box through different input conduits but leave through the same output conduit. Alternatively, two cables may enter the pull body through separate conduits and both cables exit the pull body through the same conduit.

Where access to four conduits may be achieved through the open back of the pull body as shown in FIG. 6, the pull body is known as Type X. Where the cabling passes straight through the pull box as shown in FIG. 7, it is considered a Type C, and where the cabling ends, i.e., enters the box but does not leave, the pull body is known as Type E (not shown).

In all of the foregoing types of pull boxes, access through the open back 20 of the pull body is fairly good for conduit passing through the pull body along the axis of the pull body, i.e., the pull body cavity has enough length so that the bend in the cabling is less acute as the cabling is manipulated to exit through the bottom on the pull body (Type LB), or to continue out of the far end of the pull body (Type C). However, access is much more problematic where the "output" conduit is located on one or both sides of the box due to the high sides and the narrowness of the opening in the back of the pull body in the direction the cabling has to pass to enter the output conduit.

Slightly more access is provided in the prior art pull body of FIG. 8 where the removable back 26 of the body 18 includes a varying portion of the side walls of the pull body 18, and even better access is provided in the prior art embodiment of FIGS. 9 and 10 where the removable back 30 is integral with about half of the side walls 32 of the pull body. While access is improved in such designs, access remains an annoying problem for all Type LR, Type LL, Type T and Type X pull boxes.

This continuing access problem with known conduit pull bodies are addressed by the pull bodies of the present invention where one or both sides of the pull body are removable in addition to the back, thus providing unprecedented access to the interior of the box for the manipulation of the output conduits. It is accordingly an object of the present invention to improve access in these types of pull bodies by selectively removing at least two sides, preferably three sides, of the pull body in their entirety.

The stocking of the many different configurations of pull boxes is burdensome for installers who may not know until they are present on the job site what types of pull bodies will be required for the job, i.e., there are generally code restrictions on the blocking of access to pull boxes. There are several prior art pull boxes, e.g., FIG. 11, where the flexibility of a pull box is enhanced by the use of a plurality of selectively interchangeable conduit blanks/openings are provided. While flexibility in the configuration of the pull body is increased through such designs, the use of such designs does not increase the effective width of the pull body cavity in the direction the cabling must pass, and hence does not enhance ease of use.

The need for a more "universal" conduit pull body is addressed by the pull bodies of the present invention where all four longitudinally extending panels (front, back and two sides) of the pull body are selectively removable and interchangeable. This permits the on-site construction of a pull body of the desired configuration from one of two end units and three generally rectangular panels. It is accordingly an object of the present invention to provide an assemblage of parts from which the various types of pull bodies may be created on the job site.

These and many other advantages will be readily apparent to one skilled in the art to which the invention pertains from a perusal of the claims, the appended drawings, and the following detailed description of the preferred embodiments.

DETAILED DESCRIPTION OF PREFERRED EMBODIMENTS

Figure 1:
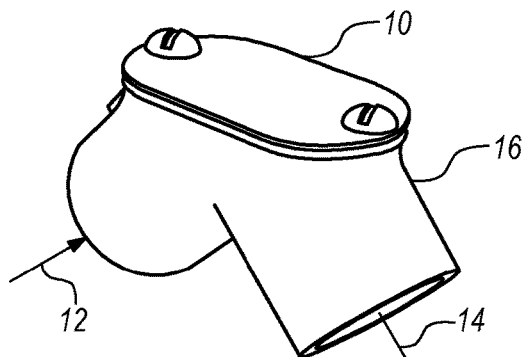
FIG. 1 is a pictorial illustration of a prior art elbow pull body.
Figure 2:
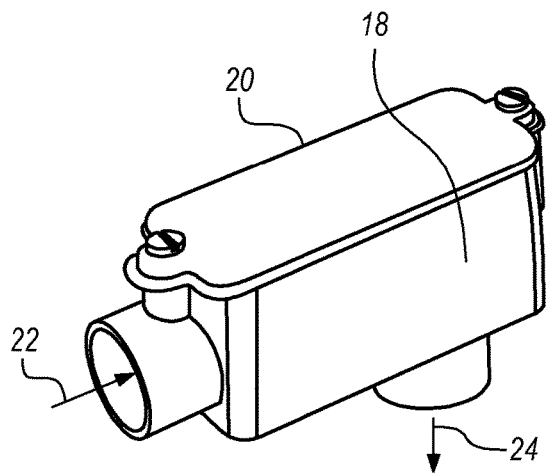
FIG. 2 is a pictorial illustration of a prior art Type LB pull body.
Figure 3:
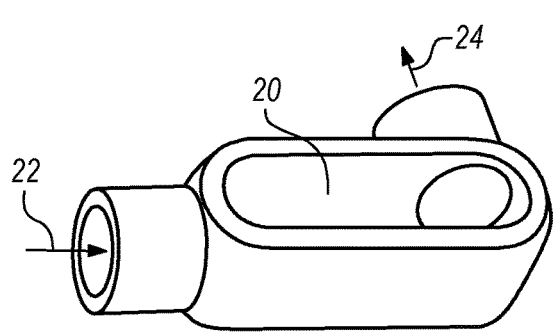
FIG. 3 is a pictorial illustration of a prior art Type LR pull body.
Figure 4:
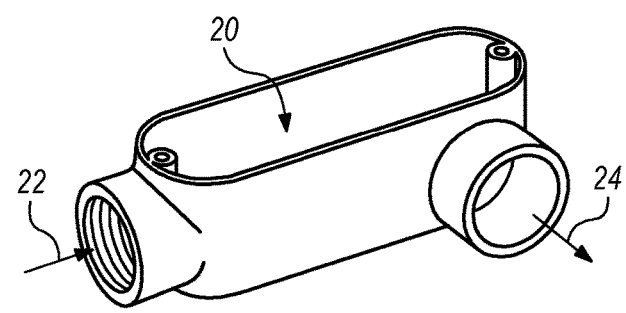
FIG. 4 is a pictorial illustration of a prior art Type LL pull body.
Figure 5:
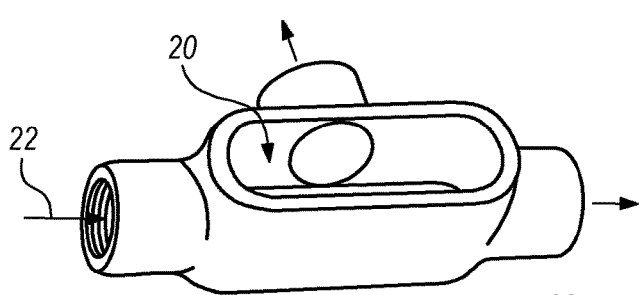
FIG. 5 is a pictorial illustration of a prior art Type T pull body.
Figure 6:
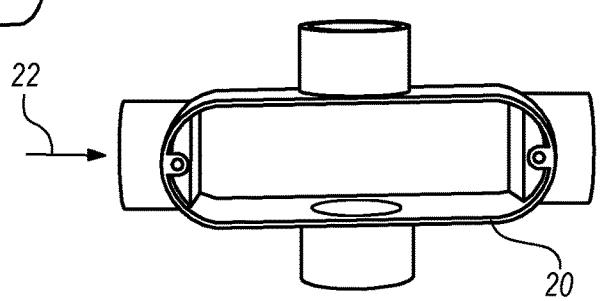
FIG. 6 is a pictorial illustration of a prior art Type X pull body.
Figure 7:
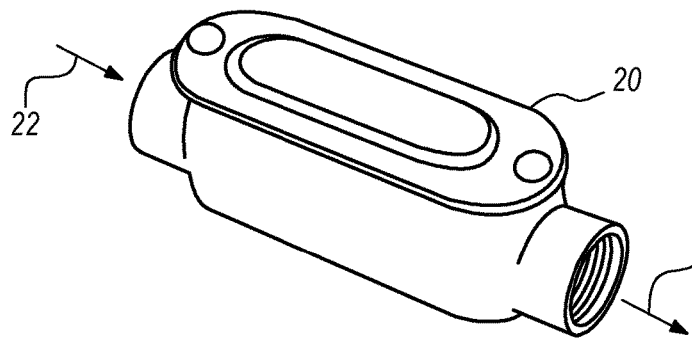
FIG. 7 is a pictorial illustration of a prior art Type C pull body.
Figure 8:
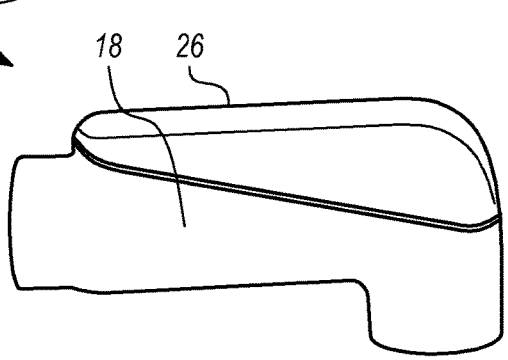
FIG. 8 is a pictorial illustration of one embodiment of a prior art Type LB pull body with a portion of both sides integrated with the removable back.
Figure 9:
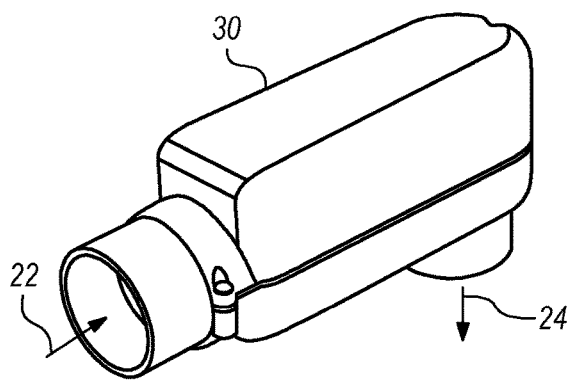
FIG. 9 is a pictorial illustration of a second embodiment of a prior art Type LB pull body with a portion of the sides integrated with the removable back.
Figure 10:
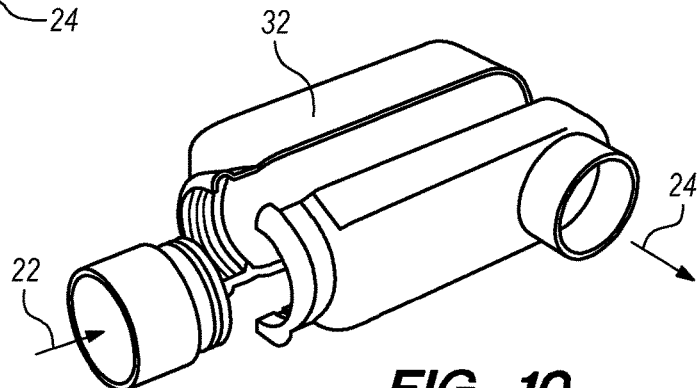
FIG. 10 is an exploded pictorial illustration of the prior art embodiment of FIG. 9.
Figure 11:
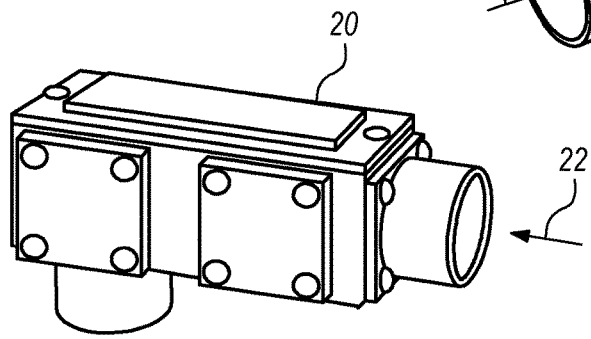
FIG. 11 is a pictorial illustration of a prior art Type LB pull body with plural selectively removable plates on the two sides and the input conduit end of the body.
Figure 12:
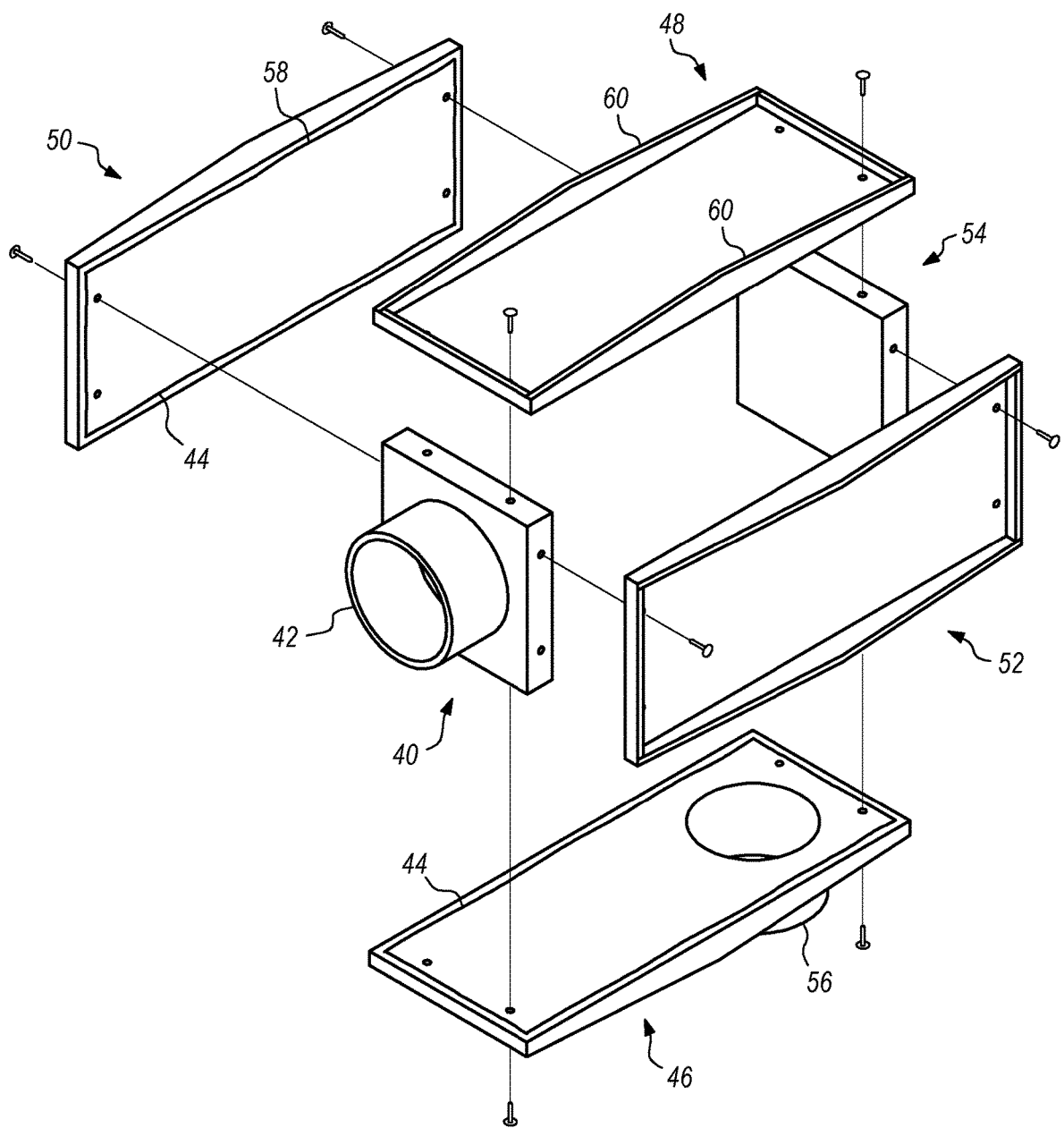
FIG. 12 is an exploded pictorial view of one embodiment of the present invention illustrating the removable assembly of the front, back and two sides to the input conduit and output conduit ends to form a pull body.

With reference now to the figures disclosing embodiments of the present invention where like numerals are used to indicate like elements throughout, one embodiment is schematically illustrated in the exploded view of FIG. 12 configured as a Type LB pull body. As shown in FIG. 12, there is an input end 40 provided with an input conduit 42. The output end 54 is not apertured, the back 48 and the sides 50,52 of the pull body are flat panels without apertures, and the front 46 is apertured at the output end thereof and provided with a downwardly extending output conduit 56. While the cross-section of the pull body and the cavity it defines is illustrated as being generally square, the actual configuration may differ significantly within the scope of the invention and may, e.g., conform to the general appearance of the prior art pull bodies illustrated herein.

Figure 14:
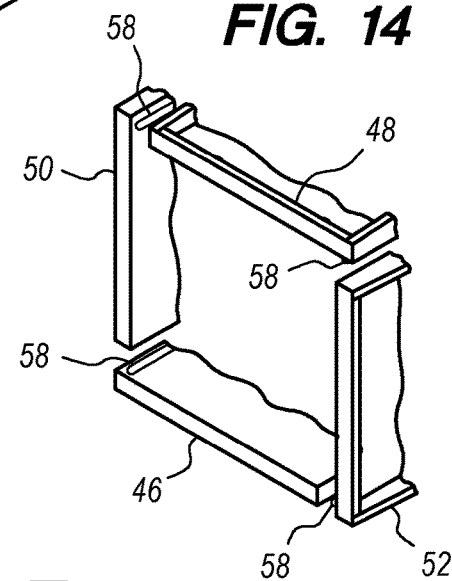
FIG. 14 is a pictorial representation of the assembly of one embodiment of the front, back and two sides illustrating the sealing thereof.

The input conduit facing surface of the end 40 may be provided with a slight lip or overhang (not shown to avoid clutter) to abut the ends of the front 46, back 48 and the two sides 50, 52. All mating surfaces, i.e., panel to end and panel to panel, are desirably provided with a suitable conventional seal 44 to ensure that the pull body is water tight. To aid in sealing the longitudinal junctures of the front 46 and back 48 to the two sides 50, 52, the components may be made to overlap as shown in FIG. 14 and provided with longitudinally extending seals 58. Other mating and sealing configurations will readily occur to one of ordinary skill in this art and both the configuration of the junctions and the number and placement of the seals may be varied by one of ordinary skill in this art without departing from the teachings hereof.

Figure 13:
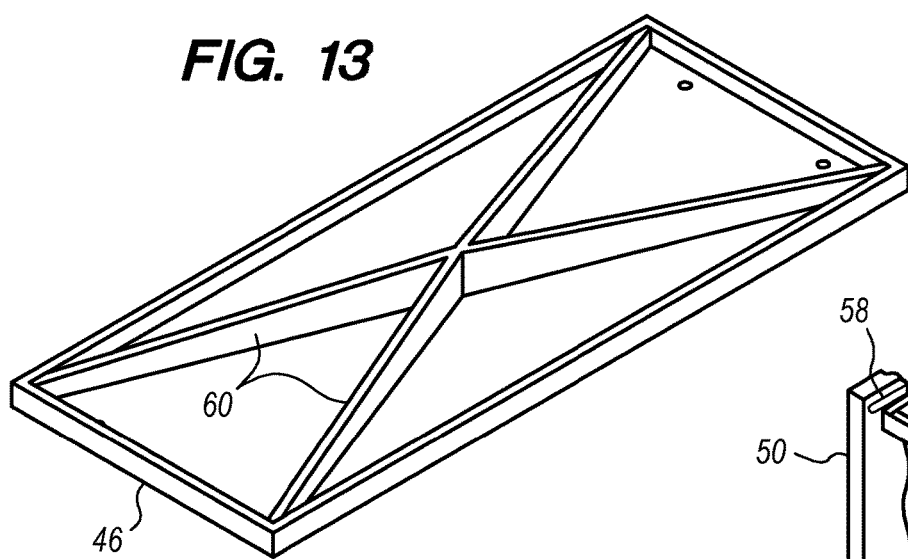
FIG. 13 is a pictorial representation of one embodiment of the back of the body with internal bracing.

The front 46, back 48 and two sides 50,52 of the pull body may be secured to the ends 40, 54 by any suitable conventional means such as the threaded fasteners shown in the Figures. Where necessary, areas internally of the longitudinal elements may be built up to receive such fasteners. The front 46, back 48 and two sides 50, 52 may also be provided with ribbing or other reinforcement 60, externally of the pull body cavity as shown in FIG. 12 or internally as shown in FIG. 13, to enhance the degree of stability as cabling is pulled into and out of the pull body.

One of the significant advantages of the present invention is that a single pull body may be carried to the job site and configured on-site as a Type B, Type LL or Type LR, significantly reducing the inventory of pull bodies that must be carried on the contractor's truck and/or the number of time consuming trips that must be made to the parts store.

Figure 15:
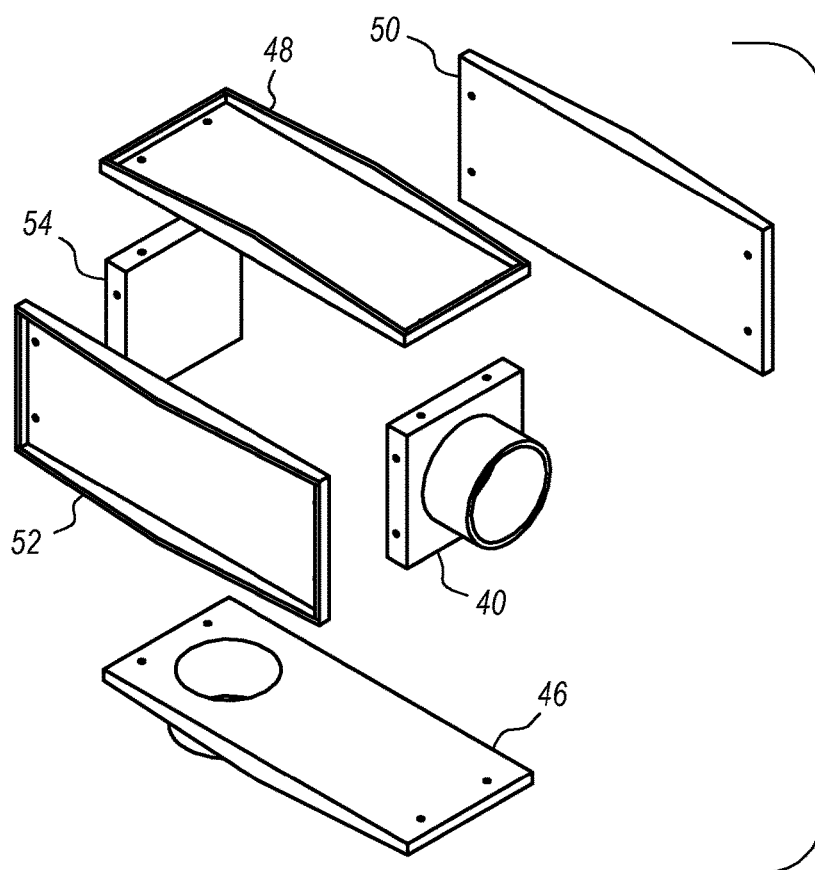
FIG. 15 is a pictorial representation of the components of a kit of the present invention showing assemblage at a Type LB pull body.

As shown in FIG. 15, a pull body kit may comprise an apertured input end 40, an unapertured output end 54, a single apertured front 46, an unapertured back 48 and two unapertured sides 50, 52. Without additional parts, these kit parts may be carried to the job site fully assembled as a pull body and the configuration thereof changed into a Type LB, Type LL, or Type LR pull body. In each of these three configurations, three longitudinal panels including the unapertured back may be entirely removed providing heretofore unattainable access to the pull body cavity as cabling in pulled into the cavity and out of the cavity, saving installation time as well as the injury to the installer's fingers.

Figure 16:
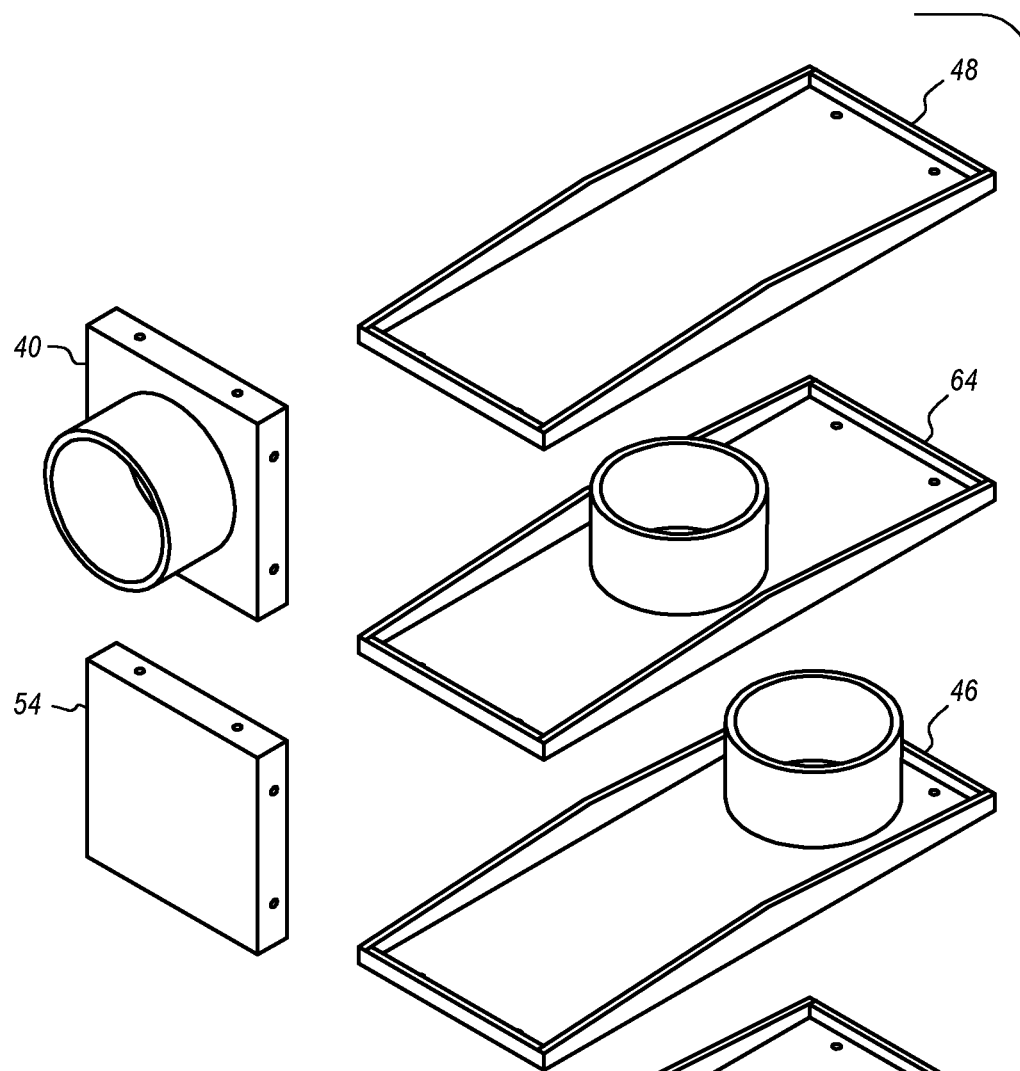
FIG. 16 is a pictorial representation the individual components that may be carried to the job site as unassembled components and there assembled to form various embodiments of the pull body of the present invention.

Additional flexibility in assembling pull bodies of various types may be had by carrying a full range of pull body parts on the installer's truck. As shown in FIG. 16, a full range of parts consists of an unapertured end 54 as shown, an apertured end 40, an unapertured back 48 which can serve as either of the two sides 50, 52, a centrally apertured side 64 for use in a Type T configuration, and an apertured front 46 which can serve as either side 50, 52 in a Type LL and Type LR configuration.

By way of example, a Type C pull body can be constructed from one input end, one output end, and four unapertured sides, a Type T pull body can be constructed from two input ends, one centrally apertured side, and three unapertured sides, a Type X pull body can be constructed from two input ends, two centrally apertured sides, and two unapertured sides, a Type E pull body can be constructed from one input end, one output end, and four unapertured sides, and a Type LB, Type LL and Type LR pull body can be constructed from one input end, one output end, one apertured side and three unapertured sides. Thus a number of different pull bodies can be constructed on the job site from only six component parts.

Figure 17:
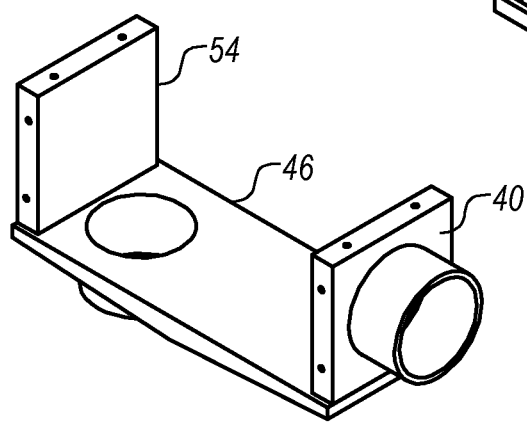
FIG. 17 is a pictorial illustration of three integrated components.

Since the most popular pull bodies are Type LB, Type, LL and Type LR, it has been found convenient to manufacture a unit with an integrally molded (a) apertured input end, (b) unapertured output end, and (c) an apertured panel, and to provide three selectively removable unapertured panels. In the configuration shown in FIG. 17, the pull body may be used as a Type LB, Type LL or Type LR simply by rotating the device around the longitudinal axis of the input conduit and cavity to position in space the integrally molded apertured panel as the "front", "left side" or "right side". Note that in all three of these installed configurations, there is one unapertured "back" and at least one additional unapertured panel that are completely removable to enhance access to the cavity of the pull body for the pulling of cabling into the cavity through the input conduit end and out of the cavity through the aperture in the molded panel without regard to the configuration in which the pull body is ultimately mounted.

All of the panels are desirably interchangeable to promote the universality of the pull body but need not be so. It is also understood that the pull body may be made of any suitable material, e.g., metal such as copper, aluminum, galvanized steel or stainless steel. However, plastics are generally preferred, e.g., the conventional grey EPVC for electrical cabling because of its fire resistant and UV resistant characteristics. Such plastics may be reinforced with carbon or other suitable fibers.

ADVANTAGES AND SCOPE OF INVENTION

Many advantages will occur to one skilled in this art from the above description of preferred embodiments. Among these advantages is the access to the pull body cavity associated with the elective removal of one or both sides of the pull body box in addition to the back thereof. A second major advantage of the present invention is the significantly enhanced flexibility in the on-the-job-site configuration of the pull body.

While preferred embodiments of the present invention have been described, it is to be understood that the embodiments described are illustrative only and many variations and modifications will naturally occur to those of skill in this art from a perusal hereof. Accordingly, the scope of the invention is to be defined solely by the appended claims when accorded a full range of equivalence.

What is claimed is:

1. In a conduit pull body defining an elongated cavity with a generally square cross-section defined by (a) a generally square input end having a cylindrical aperture therein through which cabling may be pulled into said cavity, (b) a generally square output end, (c) an elongated generally rectangular unapertured back, (d) a left side, (e) a front, and (f) a right side,
   at least one of said front, said left side and said right side having a cylindrical aperture therein through which cabling may be pulled out of said cavity, and
   said back being removably detachable from said input end and from said output end to facilitate access to said cavity,
   the improvement wherein at least one of said left side and said right side are removably detachable from said input end, said output end, and said front so that the only connection between said output end and said input end is through said front and not more than one of (i) said left side and (ii) said right side
   thereby providing unrestricted freedom of access to said cavity from said back and at least one of (i) said left side and (ii) said right side.

2. The conduit pull body of claim 1 wherein both said left side and said right side are removably detachable from said apertured end, said unapertured end and said front thereby providing unrestricted freedom of access to said cavity from said back and at both (i) said left side and (ii) said right side in pulling cabling therethrough.

3. The conduit pull body of claim 1 wherein said front in apertured; and
   wherein said input end, said front and said output end are integral.

4. The conduit pull body of claim 3 wherein said integral ends and front are molded of EPVC.

5. A pull body comprising:
   a generally square input end having an aperture therein through which cabling may be pulled,
   a generally square output end,
   four generally rectangular panels each removably attached to said ends to thereby form a pull body, said input and said output ends being unconnected except through said one or more of said four removable panels, and two of said four panels being selectively interchangeable.

6. The pull body of claim 5 wherein the number of interchangeable panels is three.

7. The pull body of claim 5 wherein a first one of said three interchangeable panels has an aperture through which cabling may be pulled to thereby form one of a Type LB, a Type LL and a Type LR pull body.

8. The pull body of claim 7 wherein said output end has an aperture through which cabling may be pulled; and
   wherein the aperture in said apertured panel is located proximate to the longitudinal middle thereof
   to thereby form a Type T pull body.

9. The pull body of claim 8 wherein a second one of said three panels has an aperture located proximate to the longitudinal middle thereof through which cabling may be pulled, and
   wherein said first one and said second one of said three panels are removably attached to said ends facing each other to thereby form a Type X pull body.

10. The pull body of claim 5 wherein said output end has an aperture through which cabling may be pulled to form a Type C pull body.

11. A conduit pull body defining an elongated cavity with a generally square cross-section being defined by (a) an input end having an aperture therein through which cabling may be pulled into said cavity, (b) an output end, and an elongated generally rectangular (c) front, (d) back, (e) left side and (f) right side panels,
    said input end and said output end being unconnected except through said panels,
    at least two of said back, said left side and said right side panels being interchangeable and removably detachable from said input end and said output end to provide unrestricted lateral access to said cavity from at least two of said back, left side and right side.

12. The conduit pull body of claim 11 wherein all three of said back, said left side and said right side panels are selectively detachable from both said input end and said output end to facilitate access to said cavity.

13. The conduit pull body of claim 11 including seals between the mating surfaces of said ends and said panels.

14. The pull body of claim 13 including seals between the mating surfaces of said panels.

15. The pull body of claim 11 including seals between the mating surfaces of said panels.

16. The method of improving access to a pull body cavity defined by two generally square ends and four generally rectangular front, back and two side panels, where the ends are unconnected to each other except through one of the panels, by the steps of completely removing the back and at least one of the side panels prior to pulling cabling into the cavity.

17. The method of claim 16 including the further step of removing both side panels prior to pulling cabling into the cavity.

18. The method of selectively creating one of a Type LB, Type LL or Type LR pull body, installing the pull body and pulling cabling therethrough comprising the steps of:

a. providing two ends one of which has an aperture through which cabling may be pulled;

b. providing four elongated panels at least one of which has an aperture through which cabling may be pulled;

c. attaching the apertured panel to the ends to create a one-panel pull body sub-assembly;

d. rotating the sub-assembly about the longitudinal axis of the aperture in the apertured end to locate the aperture in the apertured panel in the desired position for the installation as one of the front, left side of right side on the pull body;

e. only in the event that the front of the pull body has not been formed by the prior attachment of the apertured panel, attaching one of the unapertured panels to the ends to thereby form the front of the pull body and a two-panel sub-assembly;

f. installing the existing sub-assembly in the desired position for the installation;

g. pulling the cabling through the existing sub-assembly; and h. attaching the remaining panels to the ends complete the assembly of the pull body and the installation thereof as one of a selected Type LB, Type LR and Type LL pull body.

19. In a conduit pull body defining an elongated cavity with a generally square cross-section defined by (a) a generally square input end having an aperture therein through which cabling may be pulled into said cavity, (b) a generally square output end, and (c) four elongated generally rectangular panels forming front, back, left side and right side, at least one of said panels and said output end having an aperture therein through which cabling may be pulled out of said cavity, and at least two adjacent panels being removably detachable from said input end and said output end to thereby provide unrestricted access to said cavity over a lateral arc of at least about ninety degrees.

20. The pull body of claim 19 wherein the number of removably detachable panels is three to thereby provide unrestricted access to said cavity over a lateral arc of at least about 180 degrees.

* * * * *